US005484844A

United States Patent [19]
Oshima et al.

[11] Patent Number: 5,484,844
[45] Date of Patent: Jan. 16, 1996

[54] VINYL CHLORIDE RESIN ELASTOMER COMPOSITION

[75] Inventors: Masabumi Oshima; Masaji Yamamori, both of Nagoya, Japan

[73] Assignee: Mitsubishi Chemical MKV Company, Tokyo, Japan

[21] Appl. No.: 40,199

[22] Filed: Apr. 1, 1993

[30] Foreign Application Priority Data

Apr. 14, 1992 [JP] Japan .................................. 4-094495

[51] Int. Cl.$^6$ ........................................................ C08J 3/00
[52] U.S. Cl. .......................... 524/521; 524/519; 524/525; 524/569
[58] Field of Search ............................. 524/521, 569, 524/519, 525

[56] References Cited

U.S. PATENT DOCUMENTS

| | | | |
|---|---|---|---|
| 4,806,581 | 2/1989 | Walker | 524/535 |
| 5,157,076 | 10/1992 | Greenlee et al. | 525/238 |
| 5,270,381 | 12/1993 | Yamanaka et al. | 524/569 |
| 5,314,941 | 5/1994 | Yamanaka et al. | 524/425 |

FOREIGN PATENT DOCUMENTS

| | | |
|---|---|---|
| 50-145454 | 11/1975 | Japan . |
| 61-195144 | 8/1986 | Japan . |
| 63-309546 | 12/1988 | Japan . |

OTHER PUBLICATIONS

Patent Abstracts of Japan, vol. 13, No. 151, (C–584)(3499), Apr. 12, 1989, JP–A–63 309 546, Dec. 16, 1988, Y. Masuko, et al.

Primary Examiner—Peter D. Mulcahy
Attorney, Agent, or Firm—Oblon, Spivak, McClelland, Maier & Neustadt

[57] ABSTRACT

A vinyl chloride resin elastomer composition comprises 100 parts by weight of a resin mixture comprising from 50 to 95 parts by weight of a vinyl chloride resin and from 5 to 50 parts by weight of a chlorinated polyethylene; from 20 to 400 parts by weight of an acrylonitrile-butadiene rubber containing a tetrahydrofuran-insoluble crosslinking component; and from 10 to 300 parts by weight of a plasticizer.

14 Claims, No Drawings

VINYL CHLORIDE RESIN ELASTOMER COMPOSITION

The present invention relates to a vinyl chloride resin elastomer composition excellent in a compression set, creep resistance and low temperature properties.

With respect to elastomer materials, there has been an increasing demand for improvement of their properties year by year. Particularly, in the field of automobiles, an excellent compression set is demanded for materials of e.g. glass runs and weather strips.

Heretofore, soft vinyl chloride resins have been widely used as such materials, since they have flexible rubber-like texture and they are superior to vulcanized rubber in the moldability, weather resistance and tinting properties, and they have an advantage also from the viewpoint of costs. However, they are inferior to vulcanized rubber in the compression set, and their softening point is low, whereby their application for use at high temperatures has been limited. Under these circumstances, an attempt has been made for improvement by modifying the vinyl chloride resins to have high degrees of polymerization, but no satisfactory results have been obtained.

The present applicants have proposed in Japanese Patent Application No. 37205/1985 a method for producing a vinyl chloride resin thermoplastic elastomer having an improved compression set with moldability comparable to an usual vinyl chloride resin, by kneading together with an organic peroxide a composition comprising a vinyl chloride resin, a plasticizer and a rubbery material. This elastomer is excellent in the compression set, but can not satisfy the level of low temperature properties required in recent years. Therefore, an improvement of the low temperature properties has been desired. The elastomer of the above Japanese application has a substantial temperature dependency at the low temperature side, since the polarity of the vinyl chloride resin itself is strong and the cohesive force of molecules is strong, whereby when cooled, the elastomer tends to be hardened, and the change in the hardness tends to be substantial. For example, when such an elastomer is used as a sealing material at a movable part such as a weather strip of an automobile, it shows flexibility at room temperature, but when cooled to a low temperature of —20° C., it will be hardened, whereby the elasticity will decrease and the sealing properties will deteriorate.

Japanese Unexamined Patent Publication No. 309546/1988 discloses an invention of a method for producing an elastomer composition which comprises blending a chlorinated polyethylene, a plasticizer, a vinyl chloride resin and a partially cross-linked NBR (acrylonitrile-butadiene rubber) for the purpose of improving the fuel extraction resistance such as gasoline extraction resistance. However, bleeding of the plasticizer can not be avoided, since the chlorinated polyethylene is the main resin component. Therefore, the composition has drawbacks such that molded products thereof will be stained by the bleeding, and blocking will take place when such molded products are overlaid one on another. Further, the disclosed invention shows nothing about a technical concept for improving the compression set, creep resistance and low temperature properties.

Further, Japanese Unexamined Patent Publication No. 145454/1975 discloses an invention comprising a polyvinyl chloride, a butadiene copolymer, a chlorinated polyethylene and a polyester plasticizer for the purpose of obtaining a molding resin composition showing a balanced performance in the mechanical properties, heat stability, low temperature properties and processability. However, the composition is not fully satisfactory from the viewpoint of compression set and creep resistance, since the butadiene copolymer has no cross-linked structure.

The present inventors have conducted extensive studies to obtain a vinyl chloride elastomer composition containing a vinyl chloride resin as the main resin component, which is excellent in compression set and has good moldability and which is capable of presenting a molded product free from bleeding of a plasticizer or blocking and having excellent low temperature flexibility. As a result, they have found it possible to accomplish such an object by replacing a part of the vinyl chloride resin in the elastomer comprising the vinyl chloride resin, a partially cross-linked rubber material and a plasticizer, with a chlorinated polyethylene. The present invention has been accomplished on the basis of this discovery.

Namely, the object of the present invention is to provide a vinyl chloride resin elastomer composition excellent in compression set, low temperature flexibility, moldability, bleed resistance and blocking resistance, and a method for producing such a composition.

The present invention provides a vinyl chloride resin elastomer composition comprising:

100 parts by weight of a resin mixture comprising from 50 to 95 parts by weight of a vinyl chloride resin and from 5 to 50 parts by weight of a chlorinated polyethylene;

from 20 to 400 parts by weight of an acrylonitrile-butadiene rubber (hereinafter referred to as NBR) containing a tetrahydrofuran-insoluble crosslinking component; and from 10 to 300 parts by weight of a plasticizer.

Now, the present invention will be described in detail.

The vinyl chloride resin as the main resin component of the elastomer composition of the present invention may be any resin produced by subjecting vinyl chloride, or a mixture of vinyl chloride with a comonomer copolymerizable therewith to a conventional polymerization method such as suspension polymerization, bulk polymerization, microsuspension polymerization or emulsion polymerization. The comonomer may, for example, be a vinyl ester such as vinyl acetate, vinyl propionate or vinyl laurate, an acrylic acid ester such as methyl acrylate, ethyl acrylate or butyl acrylate, a methacrylic acid ester such as methyl methacrylate or ethyl methacrylate, a maleic acid ester such as dibutyl maleate or diethyl maleate, a fumaric acid ester such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene, propylene or styrene, a vinylidene halide or vinyl halide other than vinyl chloride, such as vinylidene chloride or vinyl bromide, or a polyfunctional monomer such as diacrylphthalate or ethylene glycol dimethacrylate. The comonomer is of course not restricted to the above specific examples. The comonomer is used in an amount of not more than 30% by weight, preferably not more than 20% by weight, in the constituting components of the vinyl chloride resin.

The average polymerization degree of the vinyl chloride resin is not particularly limited, but is preferably within a range of from 700 to 8,000, more preferably from 1,300 to 3,500, from the viewpoint of processability and moldability.

The chlorinated polyethylene as a resin component of the elastomer composition of the present invention can be obtained by chlorinating a powder of an ethylene homopolymer such as high density polyethylene or low density polyethylene, or a powder of a copolymer of ethylene with an α-olefin copolymerizable therewith, by introducing chlorine gas thereto under an aqueous suspension state at a temperature close to the softening temperature thereof. Otherwise, it may be the one produced by dissolving the polymer in a solvent and reacting chlorine gas thereto in the presence of a catalyst. It is preferred to employ a chlorinated polyethylene with a chlorination degree of from 20 to 45%.

The chlorinated polyethylene is added in an amount of from 5 to 50% by weight of the resin components. Namely, from 5 to 50 parts by weight of the chlorinated polyethylene is added to from 50 to 95 parts by weight of the above vinyl chloride resin, so that the total amount will be 100 parts by weight. If the amount of the chlorinated polyethylene is less than 5 parts by weight, no adequate effect for improving the low temperature flexibility can be expected. On the other hand, if the amount of the chlorinated polyethylene exceeds 50 parts by weight, the plasticizer tends to bleed out on the surface of a molded product, and pellets tend to undergo bridging, whereby feeding into a molding machine tends to be inefficient, and there will be a problem in the moldability.

The NBR contained in the elastomer composition of the present invention is required to contain a crosslinking component insoluble to tetrahydrofuran (hereinafter referred to as THF) i.e. a so-called gel content. The gel content is preferably at least 30% by weight, more preferably at least 50% by weight of the NBR. The gel content is measured in such a manner that 40 ml of THF at 25° C. is added to 1 g of a sample of the NBR under stirring, and the mixture is left to stand, and twelve hours later, the supernatant THF is removed. This operation is repeated 8 times, and the insoluble residue is dried, whereupon the gel content is calculated from the weight of the dried residue.

The THF-insoluble crosslinking component in the NBR is preferably contained in the NBR from the very beginning. More preferably, a crosslinking agent is incorporated during the preparation of the elastomer composition, and the added NBR and the crosslinking agent are subjected to a crosslinking reaction during the kneading to further increase the gel content. Of course, a NBR containing no gel content may be reacted with a crosslinking agent to form the gel content. As the former, a commercially available NBR containing a gel content may be used as it is. As the latter, a NBR and a crosslinking agent may be reacted during the preparation of an elastomer composition by heating and kneading a blend comprising a vinyl chloride resin, a chlorinated polyethylene, the NBR, the crosslinking agent, a plasticizer, etc.

The crosslinking agent to be used for crosslinking the NBR may, for example, be an organic peroxide such as cumene hydroperoxide or 2,5-dimethyl-2,5-di(t-butylperoxy)hexane, a quinone derivative such as p-quinone dioxime or p,p'-dibenzoylquinone dioxime, a phenol resin such as a bromomethylalkylated phenol resin, or an amine compound such as 1,6-hexamethylenediamine or triethylenetetramine. It is common to use the crosslinking agent in combination with a crosslinking accelerator or an age preventing agent.

The crosslinking agent is used preferably in an amount of from 0.05 to 10 parts by weight, more preferably from 1 to 5 parts by weight, per 100 parts by weight of the resin mixture.

The crosslinking accelerator may, for example, be an aldehyde amine type such as n-butylaldehydeamine, a thiourea type such as N,N'-diphenylthiourea, a guanidiene type such as di-o-triguanidine or 1,3-diphenylguanidine, a thiazole type such as 2-mercaptobenzothiazole or dibenzothiazyldisulfide, a thiuram type such as tetramethylthiuramdisulfide or tetraethylthiuramdisulfide, a sulfenamide type such as N-cyclohexyl-2-benzothiazylsulfenamide or N-oxydiethylene2-benzothiazolylsulfenamide, or a dithiocarbamic acid salt such as zinc dimethyldithiocarbamate or zinc N-ethyl-N-phenyldithiocarbamate. The age-preventing agent may, for example, be 6-ethoxy-1,2-dihydro-2,2,4-trimethylquinoline, phenyl-1-naphthylamine, octylate diphenylamine, 2,6-di-t-butyl-4-methylphenol, 2,2'-methylenebis(4-methyl-6-t-butylphenol), or 2-mercaptobenzimidazole.

The NBR is incorporated in an amount within a range of from 20 to 400 parts by weight, preferably from 50 to 300 parts by weight, per 100 parts by weight of the above resin mixture. If the amount of the NBR is less than 20 parts by weight, the compression set property tends to be inferior, and the desired physical properties can hardly be obtained. On the other hand, if the amount of the NBR exceeds 400 parts by weight, the shaping property tends to be poor, and the extrusion moldability tends to be inferior, whereby a defect such as an edge damage will result in the molded product.

When the elastomer composition of the present invention is used in combination with a plasticizer, the composition will be soft, and the kneading and processing will be facilitated, which serves to improve the compression set. The plasticizer is not particularly limited, and it may, for example, be a phthalic acid ester plasticizer such as di-2-ethylhexyl phthalate, di-n-octyl phthalate, diisodecyl phthalate, dibutyl phthalate or dihexyl phthalate; a linear dibasic acid ester plasticizer such as dioctyl azipate or dioctyl sebacate; a trimellitic acid ester plasticizer; a polyester high molecular weight plasticizer; an epoxy plasticizer such as epoxylated soybean oil, epoxylated linseed oil or a liquid epoxy resin; or a phosphic acid ester plasticizer such as triphenyl phosphate, trixylyl phosphate or tricresyl phosphate. These plasticizers may be used alone or in combination as a mixture of two or more such plasticizers.

The amount of the plasticizer varies depending upon the type and amount of the vinyl chloride resin, the chlorinated polyethylene and the NBR and upon the presence or absence of a filler, but it is usually suitably selected within a range of from 10 to 300 parts by weight, preferably from 40 to 200 parts by weight, per 100 parts by weight of the resin mixture.

It is preferred to incorporate a filler to the elastomer composition of the present invention to such an extent not to impair the compression set. The filler has a function to absorb an excess amount of a plasticizer and to facilitate the kneading and molding. The filler may, for example, be carbon black, calcium carbonate, titanium oxide, talc, aluminum hydroxide, magnesium hydroxide, hydrotalcite, clay, silica or white carbon. The filler is incorporated in an amount of at most 600 parts by weight, preferably from 10 to 550 parts by weight, per 100 parts by weight of the resin mixture. If the amount of the filler is too small, the effect for improving the kneading and molding properties tends to be small. On the other hand, if it exceeds 600 parts by weight, the moldability tends to be poor, and it is advisable to incorporate the filler within a range not to impair the moldability also from the economical viewpoint.

Further, the extrusion moldability can be improved by incorporating an acrylic resin to the elastomer composition of the present invention. The acrylic resin means a resin obtained by polymerization of acrylic acid or its derivative, and it may, for example, be a polymer or a copolymer of e.g. acrylic acid, an acrylic acid ester, acrylamide, acrylonitrile, methacrylic acid or a methacrylic acid ester. For the elastomer composition of the present invention, it is particularly preferred to use a copolymer of methyl methacrylate with an alkyl acrylate, wherein the methyl methacrylate is at least 60% by weight, preferably from 70 to 90% by weight, and the alkyl acrylate is at most 40% by weight, preferably from 10 to 30% by weight. The acrylic resin is incorporated preferably in an amount of from 1 to 30 parts by weight, preferably from 5 to 20 parts by weight, per 100 parts by weight of the total amount of the vinyl chloride resin and the chlorinated polyethylene.

Further, various additives such as a stabilizer, a lubricant, an antioxidant, an ultraviolet absorber, a blowing agent, a flame retardant, a pigment, an impact resistance-improving agent and a thermoplastic resin other than those mentioned above, may be added to the elastomer composition of the present invention, as the case requires.

The vinyl chloride resin elastomer composition of the present invention can be prepared by a method which comprises introducing predetermined amounts of the vinyl chloride resin, the chlorinated polyethylene, the NBR containing a THF-insoluble crosslinking component and the plasticizer as well as various additives such as an acrylic resin and a filler into a mixer or a kneader and mixing and kneading the mixture under heating at a temperature of from 100 to 230° C., preferably from 130° to 230° C., or a method which comprises uniformly mixing and kneading predetermined amounts of the vinyl chloride resin, the chlorinated polyethylene, a non-crosslinked or partially crosslinked NBR and a crosslinking agent, the plasticizer, the acrylic resin, the filler, etc.

From the operational viewpoint or with a view to obtaining a uniformly kneaded composition, it is preferred to prepare the elastomer composition of the present invention, for example, by the following method. Namely, a blend comprising the vinyl chloride resin and the plasticizer, and, if necessary, an acrylic resin, is preliminarily dry-blended, and then the dry blended product is mixed and kneaded with the NBR, preferably the NBR containing a THF-insoluble crosslinking component, the chlorinated polyethylene and other necessary additives such as a crosslinking agent and a filler, under heating at a temperature of from 100° to 230° C.

An apparatus to be used for mixing the above blend components, may be any apparatus so long as it is capable of uniformly mixing them. For example, it may be a Henshel mixer, a ribbon blender or a planetary mixer. To knead the mixture, an apparatus capable of kneading it under a shearing force under heating, such as an extruder, a roll mill, a Banbury mixer or a kneader, can be used. To increase the gel content of the NBR during the preparation of the elastomer composition, it is preferred to employ a closed type kneader such as a Banbury mixer, an intensive mixer or a pressure kneader, or an equidirectional twin extruder in view of the greater kneading effects.

With such a kneader, a decomposition gas from the crosslinking agent such as an organic peroxide will not escape out of the kneader, whereby the reaction efficiency will be improved in addition to the kneading effects, and the concentration of the gel content in the NBR can effectively be increased. If the kneading temperature is lower than 130° C., the crosslinking reaction tends to be slow and takes a long period of time, whereby the productivity will be poor. On the other hand, if the temperature is higher than 230° C., the elastomer composition tends to decompose.

Now, the composition of the present invention will be described in further detail with reference to Examples. However, it should be understood that the present invention is by no means restricted to such specific Examples.

Evaluation of the quality of the vinyl chloride resin elastomer compositions was conducted as follows, and the results are shown in Tables.
Compression set:
Measured in accordance with JIS K6301 at 70° C. for 22 hours under a compression of 25%.
Low temperature flexibility:
The low temperature flexibility is represented by the temperature at which the apparent modulus of elasticity in torsion becomes to be $1.0 \times 10^3$ kg/cm$^2$ in the method for testing a low temperature torsion in accordance with JIS K6301.
Extrusion moldability:
Pellets of an elastomer composition is extruded by a 20 mm$\phi$ extruder at 180° C. to form a flat belt having a thickness of 0.5 mm and a width of 20 mm, and the edge damage of the molded product was visually evaluated. Further, the surface waviness of the molded product was visually evaluated.

⊚: The extrusion molding was very efficient, and neither an edge damage nor a surface waviness was observed.

○: Neither an edge damage nor a surface waviness was observed.

Δ: Certain edge damages or surface waviness was observed.

X: Substantial edge damages were observed.

Heating test of a molded product:
In accordance with a method for testing bleed resistance, a pressed sheet having a thickness of 2 mm was left to stand for one week in a constant temperature and humidity chamber at 50° C. under a relative humidity of 60%, and then left to stand at 23° C. for one hour, whereupon the change on the surface of the molded product was visually evaluated.

○: No change such as bleeding was observed.

Δ: Bleeding was observed, or certain surface roughness was observed on the surface.

Blocking resistance:
About 200 g of pellets were put into a polyethylene bag of 12 cm×10 cm, and a weight was put thereon with a flat plate interposed therebetween so that a load of 200 g was exerted inclusive of the flat plate. After maintaining the condition at 40° C. for 12 hours, the load was removed, and the adhesion of the pellets to one another in the bag was examined.

○: No blocking was observed.

Δ: Certain blocking was observed.

X: Substantial blocking was observed.

The materials used in the Examples and shown in Tables are as follows.
*1: Chlorinated polyethylene (CPE), manufactured by Showa Denko K. K.
303 B: Chlorination degree 30%, crystalline
301 A: Chlorination degree 30%, non-crystalline
*2: NBR
PNC38: THF-insoluble crosslinking component 75 wt % (manufactured by Japan Synthetic Rubber Co., Ltd.)
Chemigum P-83: THF-insoluble crosslinking component 36 wt % (manufactured by Good Year Company)
PN30A: THF-insoluble crosslinking component 0% (manufactured by Japan Synthetic Rubber Co., Ltd.)
*3: Peroxide
2,5-dimethyl-2,5-di(t-butylperoxy)hexane
*4: Acrylic resin
P551A: Methylmethacrylate (70 to 90 wt %)/alkyl acrylate (10 to 30 wt %) (manufactured by Mitsubishi Rayon Co., Ltd.)

EXAMPLES 1 TO 9 AND COMPARATIVE EXAMPLES 1 TO 3

The predetermined parts by weight (as identified in Table 1) of the vinyl chloride resin (PVC, average degree of polymerization: 2350), the plasticizer and the filler as well as 3 parts by weight of a barium-zinc stabilizer were introduced into a Henshel mixer with a jacket temperature of 100° C. and dried up under stirring to a resin temperature of 110° C. After the drying up, the mixture was cooled to a resin temperature of not higher than 70° C. Then, the NBR containing 75% or 36% of the THF-insoluble crosslinking component and the chlorinated polyethylene (CPE) were added thereto in the respective predetermined parts by weight, followed by stirring. The mixture was kneaded by a Banbury mixer with a jacket temperature of 130° C. until the resin temperature became 170° C. and then transferred to a mill roll with a surface temperature of 160° C. and formed into a sheet, which was pellettized by a sheet cut method. Evaluation of the quality of the vinyl chloride resin elastomer composition thus obtained, was conducted, and the results are shown in Table 1.

EXAMPLES 10 TO 19 AND COMPARATIVE EXAMPLES 4 TO 6

The predetermined parts by weight (as identified in Table 2) of PVC (average degree of polymerization: 2350), 3 parts by weight of a barium-zinc stabilizer, the predetermined parts by weight of the filler and 5 parts by weight of zinc oxide were stirred in a Henshel mixer, and the predetermined parts by weight of the plasticizer was added thereto. The mixture was dried up. After the drying up, the mixture was cooled in a cooling mixer, and the respective predetermined parts by weight of the NBR, CPE, the crosslinking agent and a crosslinking accelerator were added thereto. The mixture was kneaded by a Banbury mixer until the resin temperature became 185° C., and then transferred to a mill roll with a surface temperature of 170° C. and formed into a sheet, which was pellettized by a sheet cut method. In Example 11, the mixture was kneaded by an equidirectional twin extruder and then directly pellettized. Evaluation of the quality of the vinyl chloride elastomer composition thereby obtained was conducted, and the results are shown in Table 2.

TABLE 1

| | | Examples | | | | | | | | | Comparative Examples | | |
|---|---|---|---|---|---|---|---|---|---|---|---|---|---|
| | | 1 | 2 | 3 | 4 | 5 | 6 | 7 | 8 | 9 | 1 | 2 | 3 |
| PVC | | 70 | 70 | 70 | 70 | 90 | 70 | 70 | 70 | 70 | 100 | 30 | 70 |
| CPE*1 | 303B | 30 | 30 | — | 30 | 10 | 30 | 30 | 30 | 30 | — | 70 | 30 |
| | 301A | — | — | 30 | — | — | — | — | — | — | — | — | — |
| Plasticizer | DOP | 70 | 60 | 60 | 60 | 80 | 80 | 90 | 90 | 70 | 70 | 40 | 80 |
| NBR*2 | PNC38 | 220 | 100 | 100 | 100 | 100 | 350 | 220 | 220 | — | 220 | 100 | 500 |
| | Chemigum P-83 | — | — | — | — | — | — | — | — | 220 | — | — | — |
| Filler | Calcium carbonate | 50 | 50 | 50 | — | 50 | 50 | 350 | 500 | 50 | 50 | 50 | 50 |
| | Clay | — | — | — | 50 | — | — | — | — | — | — | — | — |
| Compression set | | 35 | 39 | 40 | 38 | 40 | 32 | 33 | 33 | 42 | 34 | 35 | 31 |
| Low temperature flexibility | | −26 | −26 | −26 | −25 | −27 | −26 | −27 | −26 | −28 | −23 | −24 | −25 |
| Extrusion moldability | | o | o | o | o | o | o | o | o | o | o | o | x |
| Heating test of molded product | | o | o | o | o | o | o | o | o | o | o | x | o |
| Blocking resistance | | o | o | o | o | o | o | o | o | o | o | Δ | o |

As shown in Table 1, the elastomer compositions of the present invention are excellent in the low temperature properties and satisfactory in various properties such as compression set and extrusion moldability. In Comparative Example 1 wherein no CPE was used, the low temperature properties are somewhat inferior, although the compression set is satisfactory.

TABLE 2

| | | Examples | | | | | | | | | | Comparative Examples | | |
|---|---|---|---|---|---|---|---|---|---|---|---|---|---|---|
| | | 10 | 11 | 12 | 13 | 14 | 15 | 16 | 17 | 18 | 19 | 1 | 2 | 3 |
| PVC | | 70 | 70 | 70 | 50 | 90 | 70 | 70 | 70 | 70 | 70 | 100 | 30 | 70 |
| CPE*1 | 303B | 30 | 30 | — | 50 | 10 | 30 | 30 | 30 | 30 | 30 | — | 70 | 30 |
| | 301A | — | — | 30 | — | — | — | — | — | — | — | — | — | — |
| Plasticizer | DOP | 90 | 90 | 90 | 70 | 100 | 90 | 90 | 100 | 100 | 100 | 90 | 60 | 100 |
| NBR*2 | PNC38 | 220 | 220 | 220 | 220 | 220 | 220 | 220 | 350 | 220 | 220 | 220 | 220 | 500 |
| Crosslinking agent or accelerator | Peroxide*3 | 0.4 | 1 | 1 | 1 | 1 | 1 | — | 1 | 1 | 1 | 1 | 1 | 1 |
| | p-Quinonedioxime | — | — | — | — | — | — | 2 | — | — | — | — | — | — |
| | Dibenzothiazyl disulfide | — | — | — | — | — | — | 2 | — | — | — | — | — | — |
| Filler | Calcium carbonate | 130 | 130 | 130 | 130 | 130 | — | 130 | 130 | 350 | 500 | 130 | 130 | 130 |
| | Clay | — | — | — | — | — | 130 | — | — | — | — | — | — | — |
| Compression set | | 25 | 24 | 26 | 28 | 25 | 24 | 26 | 22 | 23 | 22 | 24 | 25 | 21 |
| Low temperature | | −27 | −27 | −28 | −25 | −28 | −27 | −28 | −26 | −25 | −25 | −23 | −25 | −25 |

TABLE 2-continued

|  | Examples |  |  |  |  |  |  |  |  |  | Comparative Examples |  |  |
|---|---|---|---|---|---|---|---|---|---|---|---|---|---|
|  | 10 | 11 | 12 | 13 | 14 | 15 | 16 | 17 | 18 | 19 | 1 | 2 | 3 |
| flexibility |  |  |  |  |  |  |  |  |  |  |  |  |  |
| Extrusion moldability | o | o | o | o | o | o | o | o | o | o | o | o | x |
| Heating test of molded product | o | o | o | o | o | o | o | o | — | o | o | x | o |
| Blocking resistance | o | o | o | o | o | o | o | o | o | o | o | Δ | o |

EXAMPLES 20 TO 24 AND COMPARATIVE EXAMPLE 7

With respect to each composition as identified in Table 3, the respective predetermined amounts of the vinyl chloride resin, the acrylic resin and the plasticizer, and 3 parts by weight of the barium-zinc stabilizer were introduced into a Henshel mixer with a jacket temperature of 100° C. and dried up under stirring to a resin temperature of about 110° C. to obtain a dry blend product. The dry blend product was cooled to a temperature of not higher than 70° C., and then the NBR, the chlorinated polyethylene, the filler and the crosslinking agent were added thereto in the respective predetermined amounts, and the mixture was kneaded by a Banbury mixer with a jacket temperature of 130° C. until the resin temperature became 170° C. in Examples 20 and 21 and 185° C. in Examples 22, 23 and 24. The mixture was transferred to a roll mill with a surface temperature of 160° C. in Examples 20 and 21 and 170° C. in Examples 22, 23 and 24 and formed into a sheet, which was pellettized by a sheet cut method. Evaluation of the quality of the obtained elastomer composition was conducted, and the results are shown in Table 3.

TABLE 3

|  |  | Examples |  |  |  |  | Comparative Example |
|---|---|---|---|---|---|---|---|
|  |  | 20 | 21 | 22 | 23 | 24 | 7 |
| PVC |  | 70 | 70 | 70 | 70 | 70 | 70 |
| CPE*1 | 303B | 30 | 30 | 30 | 30 | 30 | 30 |
| Plasticizer | DOP | 70 | 80 | 90 | 100 | 90 | 70 |
| NBR*2 | PNC38 | 220 | 350 | 220 | 350 | — | — |
|  | PN30A | — | — | — | — | 220 | 220 |
|  | Peroxide*3 | — | — | 1 | 1 | 2 | — |
| Filler | Calcium carbonate | 50 | 50 | 130 | 130 | 130 | 50 |
| Acrylic resin | P551A*4 | 10 | 10 | 10 | 10 | 10 | — |
| Compression set |  | 33 | 30 | 25 | 22 | 31 | 54 |
| Low temperature flexibility |  | −26 | −26 | −26 | −26 | −33 | −33 |
| Extrusion moldability |  | ⊙ | ⊙ | ⊙ | ⊙ | o | Δ |
| Heating test of molded product |  | o | o | o | o | o | o |
| Blocking resistance |  | o | o | o | o | Δ | x |

From Table 3, it is evident that when the NBR containing no gel content was used, the compression set is inferior although the low temperature flexibility is excellent, or a surface waving is observed on the surface of a molded product although no edge damage is observed in the extrusion molded product. The product having the acrylic resin incorporated has a merit that the extrusion moldability is thereby improved without impairing other physical properties.

The vinyl chloride resin elastomer composition of the present invention has the low temperature flexibility improved without impairing other properties such as compression set, moldability, heating test of molded product and blocking resistance by substituting a chlorinated polyethylene for a part of the vinyl chloride resin in the elastomer comprising the vinyl chloride resin, the NBR containing a partially cross-linked gel content and the plasticizer. It can be used as a material for not only extrusion molding but also calendar processing, injection molding, inflation molding or compression molding, whereby a molded product having an optional or predetermined shape can be obtained.

The vinyl chloride resin elastomer composition of the present invention is useful in a wide range of industrial, automobile and building applications, for example, for weather strips, glass runs, packings, gaskets, hoses, sheets, grips, rolls, grommets, duct boots and cushion materials.

We claim:

1. A vinyl chloride resin elastomer composition comprising:

100 parts of a resin mixture comprising from 50 to 95 parts by weight based on the weight of said resin mixture of a vinyl chloride resin and from 5 to 50 parts by weight based on the weight of said resin mixture of a chlorinated polyethylene;

from 20 to 400 parts by weight based on the weight of said resin mixture of an acrylonitrile-butadiene rubber containing a tetrahydrofuran-insoluble crosslinking component; and from 10 to 300 parts by weight based on the weight of said resin mixture of a plasticizer.

2. The vinyl chloride resin elastomer composition according to claim 1, wherein the acrylonitrile-butadiene rubber contains at least 30% by weight of the tetrahydrofuran-insoluble crosslinking component.

3. The vinyl chloride resin elastomer composition according to claim 1 or 2, further comprising: from 0.05 to 10 parts by weight based on the weight of said resin mixture of a crosslinking agent.

4. The vinyl chloride resin elastomer composition according to claim 3, wherein the crosslinking agent is an organic peroxide.

5. The vinyl chloride resin elastomer composition according to claim 1, further comprising: from 1 to 30 parts by weight based on the weight of said resin mixture of an acrylic resin.

6. The vinyl chloride resin elastomer composition according to claim 1, further comprising: from 10 to 600 parts by weight based on the weight of said resin mixture of a filler.

7. The vinyl chloride resin elastomer composition according to claim 6, wherein the filler is calcium carbonate or clay.

8. The vinyl chloride resin elastomer composition according to claim 2, further comprising from 1 to 30 parts by weight based on the weight of said resin mixture of an acrylic resin.

9. The vinyl chloride resin elastomer composition according to claim 3, further comprising from 1 to 30 parts by weight based on the weight of said resin mixture of an acrylic resin.

10. The vinyl chloride resin elastomer composition according to claim 4, further comprising from 1 to 30 parts by weight based on the weight of said resin mixture of an acrylic resin.

11. The vinyl chloride resin elastomer composition according to claim 2, further comprising from 10 to 600 parts by weight based on the weight of said resin mixture of a filler.

12. The vinyl chloride resin elastomer composition according to claim 3, further comprising from 10 to 600 parts by weight based on the weight of said resin mixture of a filler.

13. The vinyl chloride resin elastomer composition according to claim 4, further comprising from 10 to 600 parts by weight based on the weight of said resin mixture of a filler.

14. The vinyl chloride resin elastomer composition according to claim 5, further comprising from 10 to 600 parts by weight based on the weight of said resin mixture of a filler.

* * * * *

UNITED STATES PATENT AND TRADEMARK OFFICE
CERTIFICATE OF CORRECTION

PATENT NO.   : 5,484,844
DATED        : Jan. 16, 1996
INVENTOR(S)  : Masabumi OSHIMA, et al.

It is certified that error appears in the above-indentified patent and that said Letters Patent is hereby corrected as shown below:

On the title page, Item [*], the terminal disclaimer information, should read:

--The term of this patent shall not extend beyond the expiration date of Patent Number 5,314,941.--

Signed and Sealed this

Twenty-third Day of April, 1996

Attest:

BRUCE LEHMAN

*Attesting Officer*    *Commissioner of Patents and Trademarks*